United States Patent [19]
Harvard et al.

[11] Patent Number: 5,382,026
[45] Date of Patent: Jan. 17, 1995

[54] MULTIPLE PARTICIPANT MOVING VEHICLE SHOOTING GALLERY

[75] Inventors: Albert F. Harvard, Huntington Beach, Calif.; Kenneth R. Brooke, Arlington, Tex.

[73] Assignee: Hughes Aircraft Company, Los Angeles, Calif.

[21] Appl. No.: 210,094

[22] Filed: Mar. 17, 1994

Related U.S. Application Data

[63] Continuation of Ser. No. 20,895, Feb. 22, 1993, abandoned, which is a continuation of Ser. No. 763,847, Sep. 23, 1991, abandoned.

[51] Int. Cl.$^6$ .............................. F41J 5/10; F41J 9/14
[52] U.S. Cl. .................. 273/310; 273/85 G; 273/312
[58] Field of Search ................ 273/310–312, 273/85 G; 434/20–22

[56] References Cited

U.S. PATENT DOCUMENTS

| | | | |
|---|---|---|---|
| 3,960,380 | 6/1976 | Yokoi | 273/311 |
| 4,349,337 | 9/1982 | Pardes | 273/310 |
| 4,680,012 | 7/1987 | Morley et al. | 273/310 |
| 4,830,381 | 5/1989 | Sellner | 273/312 |
| 4,976,438 | 12/1990 | Tashiro et al. | 273/313 |
| 5,127,657 | 7/1992 | Ikezawa et al. | 273/312 |

FOREIGN PATENT DOCUMENTS 2029554  3/1980  United Kingdom ................ 273/313

*Primary Examiner*—Benjamin H. Layno
*Attorney, Agent, or Firm*—W. K. Denson-Low

[57] ABSTRACT

An interactive system that employs moving vehicles in which participants ride and from which they engage computer-generated pop-up and prepositioned simulated targets using simulated weapons. The vehicle carries the participants a predetermined distance using a track or trough-guidance mechanism through a covered and darkened path as they engage the simulated targets. Each participant operates independently of the others and engages targets that are displayed during travel along the track. The participants occupy seats having safety restraints, and operate a fixed, swivel-based simulated weapon and sight it to fixed targets having predetermined locations and to the targets generated by a computer in accordance with a preselected scenario. Each vehicle has a transponder that provides continual broadcasts of location and game data. This coordinated data specifically locates a moving eyepoint so that the portrayed scenes can be made geometrically correct. This also gives the illusion of 3-D depth through perspective and parallax effects.

19 Claims, 5 Drawing Sheets

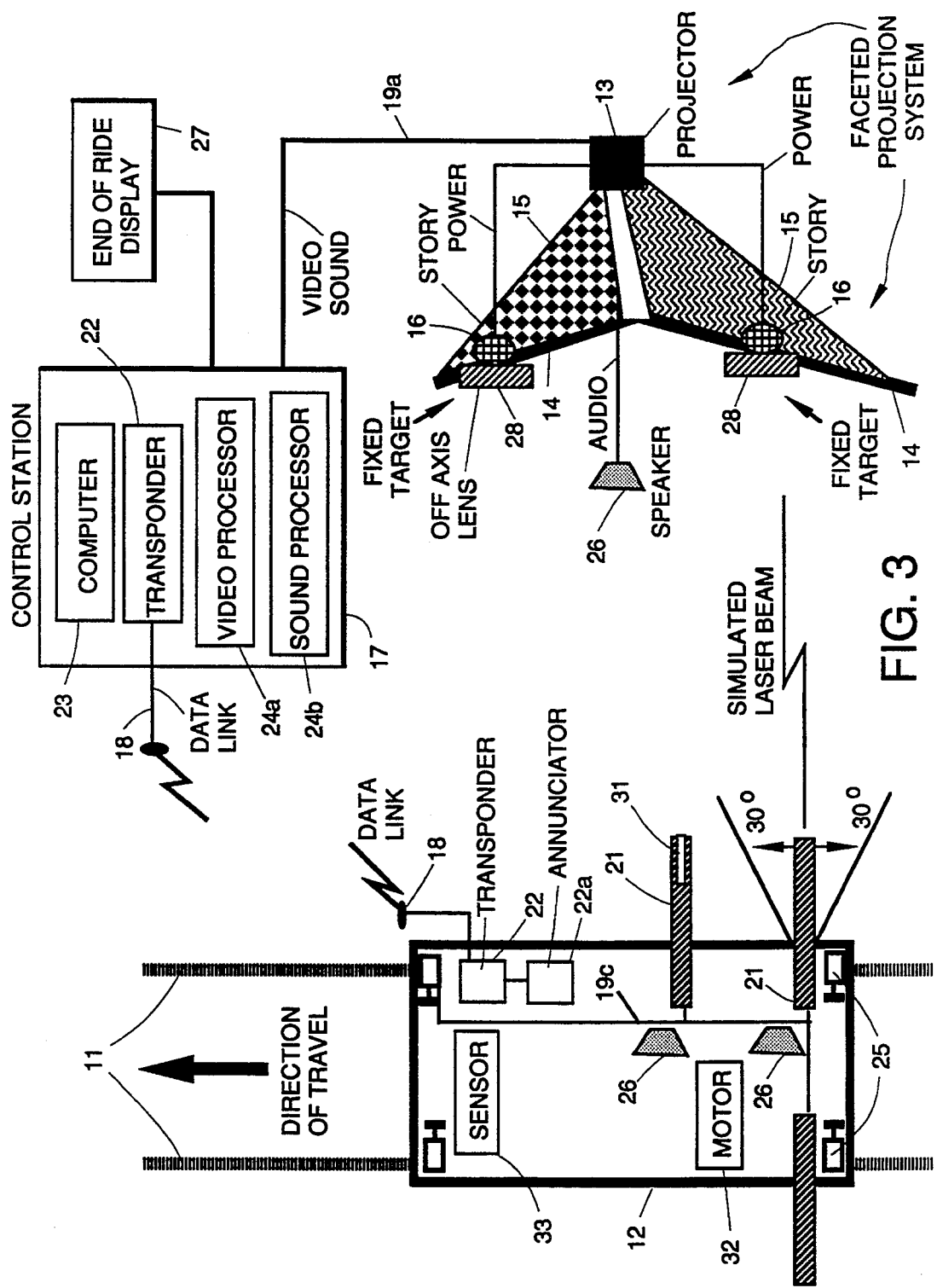

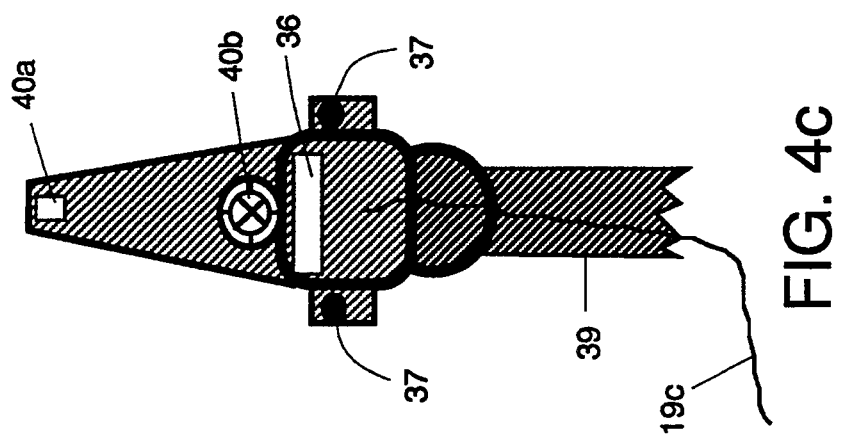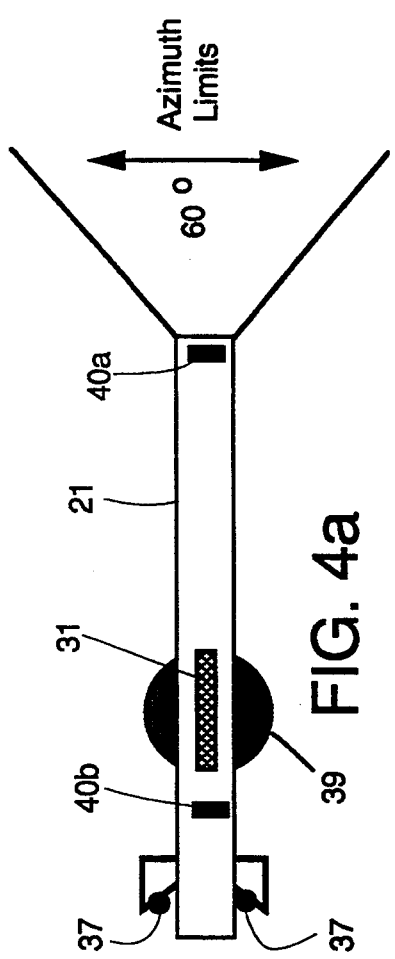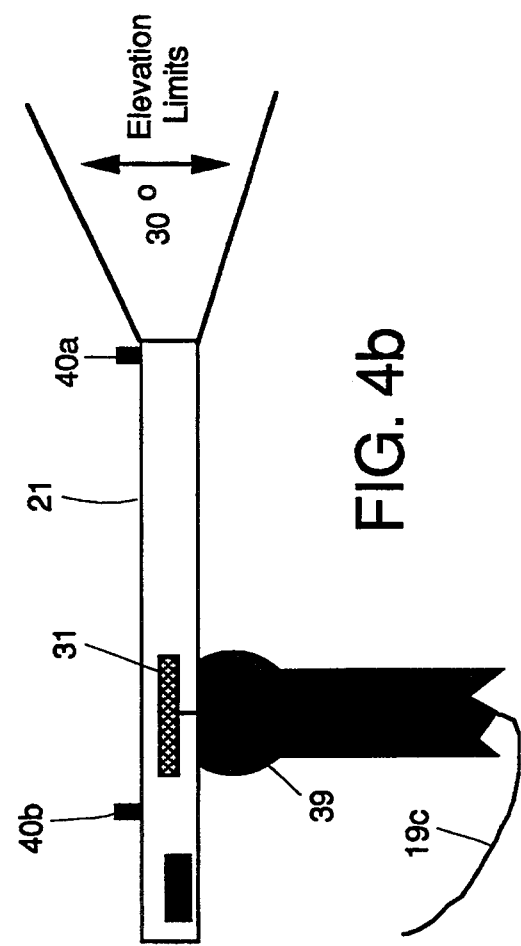

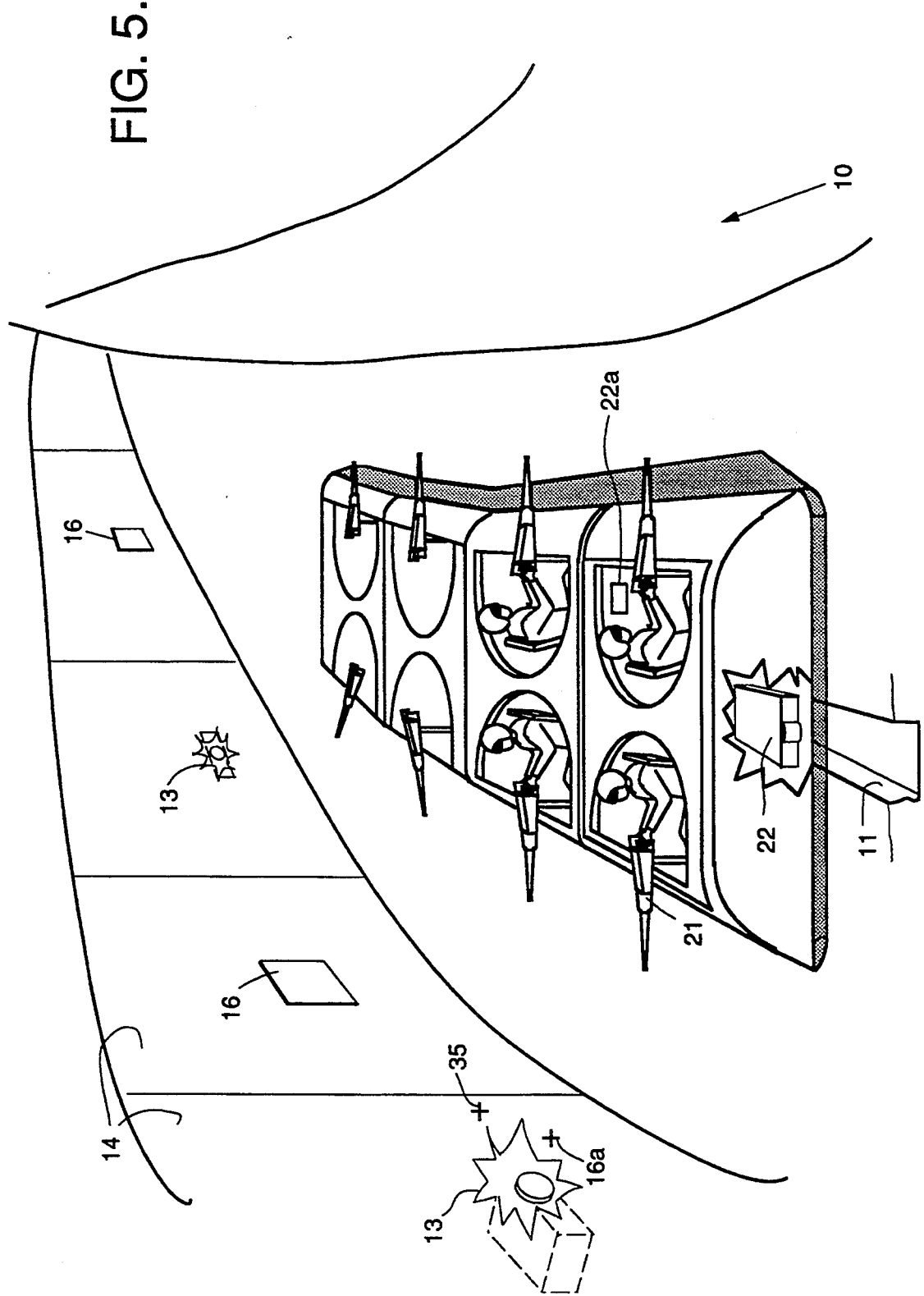

MULTIPLE PARTICIPANT MOVING VEHICLE SHOOTING GALLERY

This is a continuation of application Ser. No. 08/020,895 filed Feb. 22, 1993 now abandoned, which is a continuation of application Ser. No. 07/763,847 filed Sep. 23, 1991 now abandoned.

BACKGROUND

The present invention relates generally to theme park rides, and more particularly, to a multiple participant moving vehicle shooting gallery system employing simulated computer-generated interactive video.

Shooting gallery type activities are not new to the entertainment business, and certainly not to the amusement park industry. In recent years, shopping malls have become a location of amusement park type attractions with both iron rides, such as roller coasters, and the like, and dark rides, such as roller coasters located within buildings, wherein the passengers ride in the dark. The advent of these attractions, first installed in the Edmonton, Alberta, Canada Shopping Mall, launched a new concept called a family entertainment center.

However, heretofore, no conventional amusement park type ride has employed a system wherein participants move through a simulated environment and conduct interactive engagements with simulated weapons. Furthermore, no conventional amusement park type ride has provided a varying range of experiences by the nature of changing visual environments, and pseudo teamwork based upon hitting targets.

It is therefore an objective of the present invention to provide an interactive, moving, shooting arcade-like game, using various game scenarios whereby participants score virtual hits on targets as they travel the length of the course, by using simulated laser weapons. Another objective of the invention is to provide a ride suitable for use in a theme park, amusement park, or a family entertainment center.

SUMMARY OF THE INVENTION

In accordance with these and other objectives and features of the invention, there is provided an interactive, multiple participant, networked system that comprises a set of moving (real-time) vehicles in which participants ride and from which they engage computer-generated pop-up and prepositioned fixed targets using simulated laser weapons.

More particularly, the present invention is a multiple participant moving vehicle shooting gallery system that comprises an enclosed track adapted to move a vehicle through a path illuminated by a story line projection. At least one vehicle is disposed on the track that includes a seat for accommodating a participant, a fixed, swivel-based simulated weapon that is actuatable by the participant, and a first communication device for communicating data and control information to and from the vehicle.

The system includes a projection system comprising a plurality of rear-screen projectors and a plurality of speakers disposed adjacent the track. A plurality of projection screens are disposed adjacent the track between the projectors and the vehicle. The projectors are adapted to project images onto the screens that comprise simulated targets, and the plurality of speakers are adapted to project sound in conjunction with the projected images.

The system further includes a control station comprising a computer, a real-time graphics computer, a sound system including a sound processor coupled to the plurality of speakers, and a second communication device for communicating data and control information to the first communication device. The computer, real-time graphics computer, and sound system control projection of images and sound representative of the simulated targets to which the participants respond. The computer controls the movement of the vehicle along the track, and processes hits and misses scored by the participants in response to operation of the weapon.

The system may also include a plurality of fixed targets disposed adjacent the track and plurality of projections screens that are controllable by the control station. The vehicle may further comprise a plurality of vehicle actuators that are adapted to control movement of the vehicle in response to control signals provided by the control station that correspond to the engagement of the targets by the participant. The simulated weapon may further comprise a laser dime adapted to detect predetermined light levels located in the projected images that are indicative of a hit on the target in the vicinity of the predetermined light levels when a trigger is depressed, and which is adapted to generate a signal indicative of hits and misses that is communicable to the central station by the first communication device.

The present invention comprises a system that requires travel in a vehicle, such as a train, boat, simulated plane, bus, or truck, etc. As such, the vehicle carries the participants a predetermined distance as they engage simulated targets. The travel is through covered and darkened paths. Each participant operates independently of the others and engages targets of opportunity that are displayed during the ride. The participants occupy seats having safety restraints and operate the simulated weapon by sighting it at the targets generated by a computer in accordance with a preselected scenario.

Vehicles are dispatched in accordance with a system operation plan that allows multiple vehicles operating at the same time as throughput requirements dictate. Each vehicle has a transponder that provides continual broadcasts of location and game data. This coordinated data specifically locates a moving eyepoint so that the portrayed scenes can be made geometrically correct. In this way, images are synchronized to the movement of the vehicles, and whereby the images appear stationary relative to the moving vehicles. This also gives the illusion of 3-D depth through perspective and parallax effects.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a system block diagram of the multiple participant, moving vehicle shooting gallery of FIG. 1;

FIG. 4a–4c show several views of a simulated laser cannon employed in the multiple participant, moving vehicle shooting gallery of FIG. 1;

FIG. 5 shows a typical operating embodiment of the multiple participant, moving vehicle shooting gallery of the present invention.

DETAILED DESCRIPTION

Figure 1:
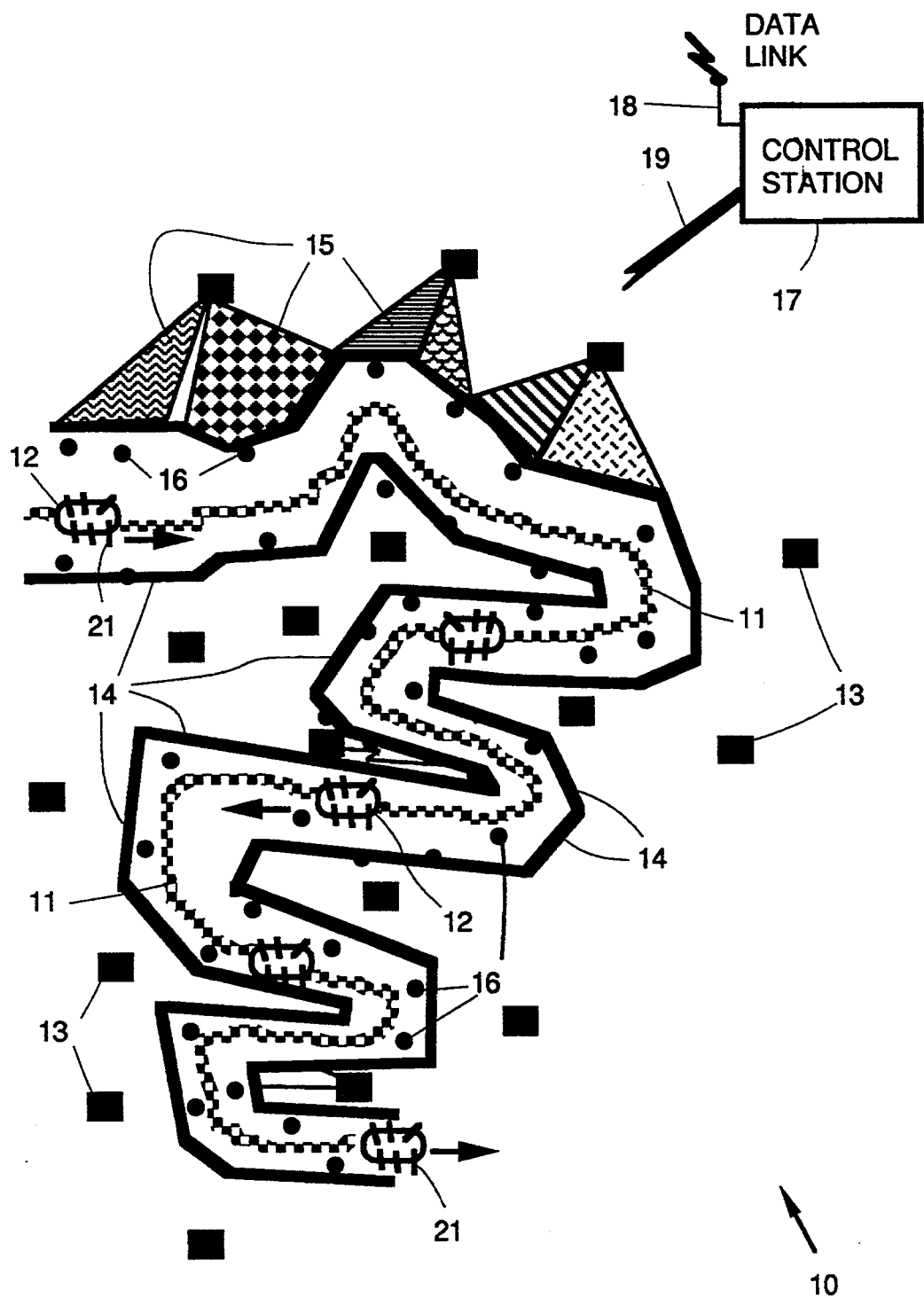
FIG. 1 shows a pictorial diagram of a multiple participant, moving vehicle shooting gallery in accordance with the principles of the present invention.

Referring to the drawing figures, FIG. 1 shows a multiple participant moving vehicle shooting gallery system 10 in accordance with the present invention. The system 10 comprises a travel path 11 or track 11, a plurality of vehicles 12, a plurality of projectors 13, a plurality of translucent projection screens 14, a plurality of story line images 15 projected onto the screens illustrated by various shading in the drawing, a plurality of fixed targets 16, and a control station 17. Each of the individual story line images 15 are represented by a different cross hatching or shading in FIG. 1. The fixed targets 16 are typically incorporated in the back-projected screens 14.

The control station 17 comprises a computer, a real time graphics computer, a sound processor, and a data link 18 that communicate with each of the vehicles 12 by way of a transponder located in each of the vehicles 12. The control station 17 also includes power and control cabling 19 that comprises a power and data network 19, that is coupled to the plurality of projectors 13, the fixed targets 16 and to the track 11 in order to control movement and operation of the plurality of vehicles 12. Each of the vehicles 12 is shown having a plurality of simulated cannon weapons 21.

The plurality of projectors 13 are adapted to project images 15 onto the screens 14 in a controlled manner under control of the control station 17. The image projection is achieved so that the particular story line flows along with a corresponding one of the vehicles 12 as it moves along the track 11. The story line images 15 change at selected time or distance intervals as will be detailed below.

Figure 2:
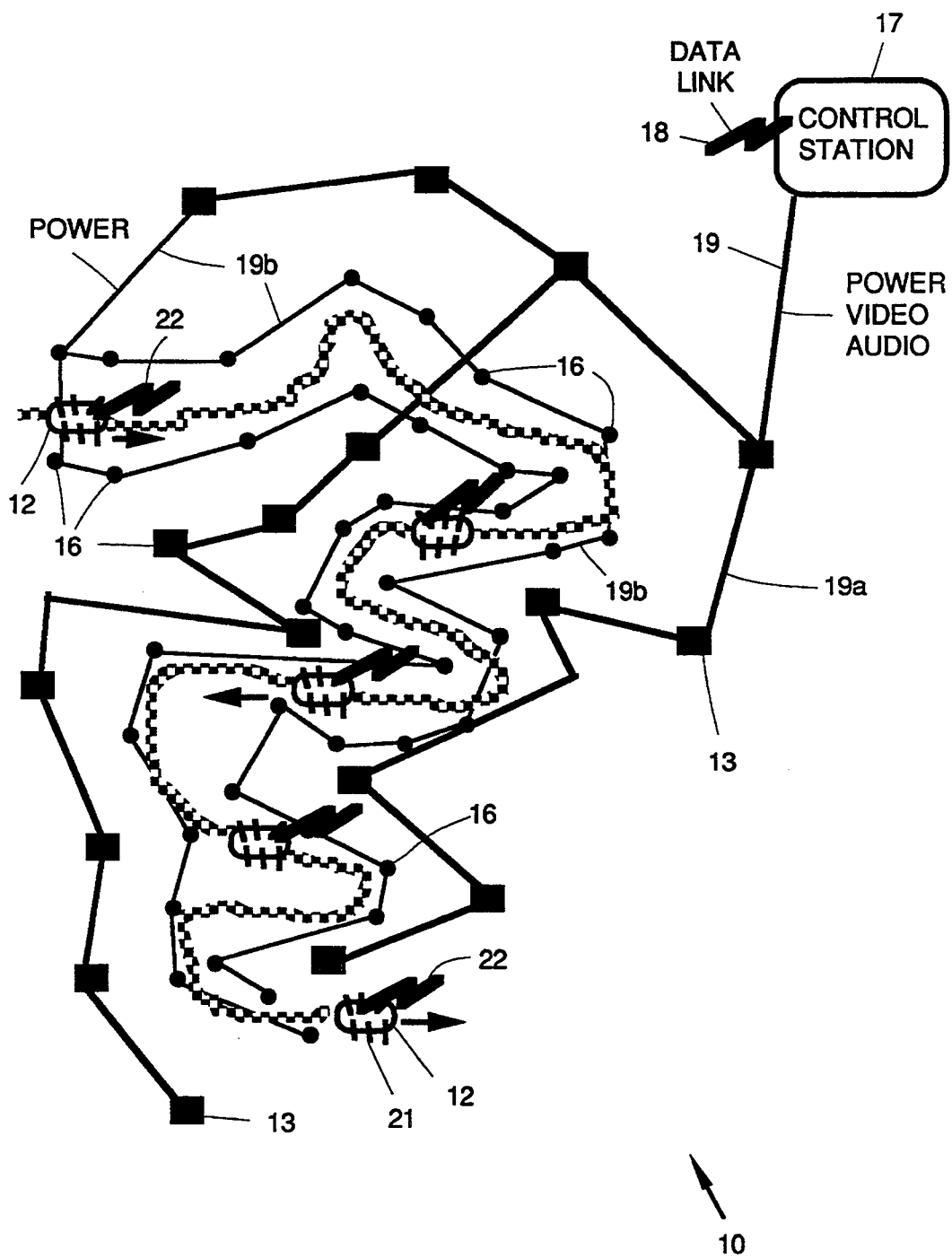
FIG. 2 provides an overview of the power and data network employed in the multiple participant, moving vehicle shooting gallery of FIG. 1.

FIG. 2 provides an overview of the power and data network 19 employed in the multiple participant, moving vehicle shooting gallery of FIG. 1. FIG. 2 provides an overview of the power and data network 19 highlighting the cabling 19a, 19b and data link transponders 22 in each vehicle 12. The transponders 22 in the vehicles 12 and the dam link 18 in the control station 17 may be conventional RF, UHF, or fiber optic type transponders, for example.

FIG. 3 is a system block diagram of the multiple participant, moving vehicle shooting gallery system 10 of FIG. 1. The system 10 illustrates the central control station 17 which comprises a portion of a sound system that includes a sound processor 24b and a plurality of speakers 26, and a video processor. Both processors 24a, 24b are controlled by a computer 23. The control station also includes an end-of-ride display 27 whose output is controlled by the computer 23.

FIG. 3 shows the electrical and mechanical components of the vehicle 12, its actuators 25, and simulated cannon weapons 21. The relationship between the vehicle 12, the projection screens 14, the projectors 13, and the fixed targets 16 is illustrated. The fixed targets 16 may be masked by off-axis covers 28, comprising louvered plastic, such as Lexan, for example, much like the lenses on traffic lights. The relationship between the fixed targets 16, the projection screens 14 and the projectors 13 is illustrated. Data communicated by way of the data data link 18 to and from the transponder 22 in the vehicle is shown. The data that is typically communicated between the vehicles 12 and the central station 17 include: weapon number, target number (hit or miss), sound cues, vehicle number, vehicle actuator movement data and vehicle location data. This data is processed in a conventional manner to control the movement of the vehicle 12 and the actuators 25, and process and display target engagement information for each of the vehicles 12.

More specifically, the vehicle 12 comprises the plurality of simulated cannon weapons 21, typically arranged back-to-back, with a total of eight cannon weapons per vehicle 12, for example. The plurality of actuators 25 are disposed relative to seats in which the participants sit and are adapted to move the vehicle and/or seats in response to occurrences in the story line and hits and misses as a result of firing the simulated cannon weapon 21.

The control station 17 comprises a computer 23, that is coupled to a video processor 24a and a sound processor 24b, and the data link 18. The control station 17 communicates by means of a transponder 29 with each of the vehicles 12 by way of the transponder 22 located in each of the vehicles 12. The control station 17 also includes the end-of-ride display 27 that is adapted to provide scoring information and rewards or prizes to the passengers at the end of the ride.

FIG. 4a–4c show top, side and rear views of the simulated laser cannon weapon 21 employed in the multiple participant, moving vehicle shooting 10 gallery of FIG. 1. The simulated cannon weapon 21 comprises a pedestal 39 through which a cable 19c passes that is part of the power and data network 19 is passed to provide power and scoring information. The simulated cannon weapon 21 includes a scoring mechanism 36 or shot counter, a photo dime 31 or a light pens, for example, that is used to simulate a laser beam, and a trigger 37. Front and rear sights 40a, 40b are provided for the purpose of aiming the simulated cannon weapon 21. Shot count is displayed on the scoring mechanism 36 on the face of the simulated cannon weapon 21 for the participant to see. The cannon may be reloaded at the discretion of the theme park as an option through the use of appropriate software control. Power for the cannon weapon 21 is provided by way of the cabling 19c. The simulated cannon weapon 21 has a range of motion controlled by safety apparatus (stops, for example) and has the ability to turn toward the target. The range of motion may typically be 30 degrees in elevation and 60 degrees in azimuth, for example.

FIG. 5 shows a typical operating embodiment of the multiple participant, moving vehicle shooting gallery system 10 of the present invention. The system 10 is shown moving along the track 11 within a darkened pathway. Two projectors 13 are shown located behind the projection screens 14. Two fixed targets 16 are shown disposed in front of the projection screens 14. The transponder 22 located in the vehicle 12 is also shown.

More specifically, the present invention comprises a system 10 that is a moving amusement park ride that requires the travel in the vehicle 12, which may comprise a train, boat, simulated plane, bus, or truck, etc. As such, the vehicle 12 carries the participants a predetermined distance as they engage simulated targets 16, 16a.

The participants travel through a covered and illuminated travel path 11. Configuration of the system 10 to provide for specified throughput levels is left to the selection of the owner, based on the capacity required. For descriptive purposes of this disclosure, throughput has been optimized at 1000 persons per hour with maximum use of central computer processing and control for both scene generation and safety.

The vehicle 12 travels along a predetermined guided length of track 11, for example. However, other vehicle propagation techniques may be employed, such as by water movement systems, and the like. The vehicles 12 are dispatched in accordance with a system operation plan that allows for multiple vehicles 12 operating at the same time as throughput requirements dictate. For example, with a track length of 3000 feet, operating 8 persons per vehicle 12, and a safety factor of 20 sec between cars, at a fixed rate of 4.8 mph, and 85% efficiency, a throughput of 850 participants per hour is achieved using twenty vehicles 12 on the track 11 at any given time.

Each vehicle 12 has an annunciator 22a that is part of its transponder 22 that provides continual broadcasts of location and game dam. This coordinated data specifically locates a moving eyepoint 38 so that portrayed scenes of the story line images 15 are made geometrically correct from the participants viewpoint. This also gives the illusion of 3-D depth through perspective and parallax effects.

Each participant has a specified field-of-play, defined by the participant's field of view, whereby a participant using the simulated cannon weapon 22 engages the simulated targets 16a that are provided by computer generated images 15 displayed on the back-projected projection screens 14. The fixed targets 16 are images that are generated in front of the projection screens 14. For the purpose of this description there are two types of targets: fixed 16 and pop-up 16a. All fixed targets 16 may be masked by the off-axis covers or lenses 28, much like the lenses on traffic lights. The covers create a parallax phenomena and are engaged only in very narrow fields of play. Therefore, scoring is higher, giving the participants the feeling that they had achieved a difficult objective. Pop-up or moving targets 16a are featured as pan of the back-projected video story and may be engaged by several of the participants simultaneously.

The targets 16, 16a are successfully engaged when the photo dime 31 (simulated laser beam) detects specifically predetermined pixels of the action sequence (located at the targets 16a) on the screen 14, or from the lighted areas of the fixed targets 16. The cannon weapon 21 activates a scoring mechanism 36 or shot counter when an aim point 35 of the photo diode 31 (simulated laser beam) fits within a specified field of detection and a trigger 37 is engaged. Participants are assigned color-coded cannons at the beginning of the ride. In this way, successful engagement of the fixed or pop-up targets 16, 16a is shown by a puff of colored smoke corresponding to the color assigned to their weapon 21. Shot count is regulated whereby the participant may run out of shooting capacity before the end of the ride. Shot count is provided on scoring mechanism 36 or shot counter on the face of the simulated cannon weapon 21 for the participant to see. Power for the vehicle 12 is provided from the track 11 by way of cabling 19c in a manner substantially similar to conventional bumper cars.

To ensure that in general, participants do not memorize the system 10, and to give a large variety to the gamesmanship, there are, for example, seven (7) scenarios. Each is projected at the same time to seven different screens/walls, or the like. As the participants move through the system 10 they encounter all seven stories. At preselected times, for example, daily, the scenarios rotate to another screen and their sequence changes, as outlined in Table 1 below. The story lines remain the same.

TABLE 1

| | Story Scramble | | | | | | |
|---|---|---|---|---|---|---|---|
| SCREEN | 1 | 2 | 3 | 4 | 5 | 6 | 7 |
| STORY | A | B | C | D | E | F | G |
| DAY 1 | A | B | C | D | E | F | G |
| DAY 2 | B | D | F | A | C | G | E |
| DAY 3 | C | E | G | B | D | A | F |
| DAY 4 ... | | | | | | | |

The vehicle 12 travels at 4.8 mph (akin to a slow trot) by its own electric motor 32. The system 10 is subject to motion cueing changes in pitch and roll induced by the story line through air actuators 25 installed at the comers of each vehicle 12. There are numerous curves along the track 11 to maximize usage of limited real estate. Safety sensors 33 ensure crash avoidance and easy slowing for turns, and for stopping at the end of the ride.

Data from the system 10 is gathered in real-time from the cannon weapons 21, passed through the cabling 19 or a fiber-optic network to the transmitter portion of the transponder 22 installed on the vehicle 12. Data, which includes vehicle 12, cannon 21, and target identification, assigned color, vehicle location, hit/miss, shot count, and sound cue is then transmitted to a receiver portion of the transponder 29 at the central data and control processing center 17 whereby real-time effects are induced into the computer generated story. Additionally, vehicle scores are calculated and summarized for display at the end of the ride. Individual scores are summarized at the end of the ride at the cannon weapon 21 and, by use of a cash register type system, printed onto a card that is dispensed before the participant releases his or her safety belt. The summary score for the vehicle 12, displayed at the end of the ride, is identified to that vehicle 12 by the broadcast.

The present invention provides vehicle seating for a selected number of passengers, each of which operate the simulated laser cannon weapon 21 and interactively engage the targets 16, 16a during a 410 sec (approximately 7 min) ride through varying simulated environments. The participants score points for each successful engagement of varying fixed and scenario driven pop-up targets 16, 16a. At the end of the ride they are awarded a paper card souvenir of their score. Additionally before disembarking, the total score of the ride, and/or individual scores are displayed for all participants to see. Relative merit is also displayed, relating to standard values, such as: 1000 or more points equals a gold medal or free trip to another ride, 999-850 allows the crew passage on a selected ride, etc.

An example of the end-of-ride summary is shown below:

| | | Total Points | Prize |
|---|---|---|---|
| Arriving Vehicle: | Rough-Seas | 751 | Tar 'n Feathers |
| today's high score | Cruiser-1 | 1140 | Trip to Stapler |

| | -continued | |
|---|---|---|
| | Total Points | Prize |
| | | Galaxy |

Provisions to display the participants name at an "End-of-Ride Display" may be easily adapted and is optional.

Since the entire ride is in a darkened surrounding, dark adaptation for the participants is a feature of a queuing effort. Participants en mute to their vehicles 12 pass through several rooms or pathways (not shown) having continually reduced lighting. During their trip the participants are exposed to the nature and objective of the game through video displays and audio broadcasts. Story lines for pregame activities are the responsibility of the park or fun center, since there also is the opportunity for commercial advertising. By the time the participants reach the game area they will have passed from daylight (approximately 5-20 foot Lamberts) to dark adaptation (approximately 1 foot Lamberts). Thus, the ambient brightness of the display is decreased from the brightness level at the beginning of the ride to an efficient level somewhat into the ride.

The projection system, comprising the projectors 13 and projection screens 14, is an adaptation of an invention disclosed in U.S. patent application Ser. No. 07/704,571, filed May 13, 1991, entitled "Rear Projection Faceted Dome", assigned to the assignee of the present invention. In the present invention, the stories are displayed by use of a system providing computer generated video images to strategically placed projectors 13 throughout the ride. The images are displayed on a rear projection faceted dome which uses a translucent rear-projection screen 14. Each screen 14 is overlapping in which distortion effects are easily corrected and edge matching is easily implemented. The method for projection of the computer generated video in a manner to provide low cost maximum coverage in a low light condition, is contained in the above-cited patent application, which is incorporated herein by reference. Sound cues are fed, via the data link, to strategically located speakers 26 adapted with an sound system known as SRS, developed by the assignee of the present invention, thus providing 3-D directional sound effects. Provisions are made that locate the speakers within each vehicle 12 at the request of the customer (theme park operator).

Sample scenario. The following is what a participant experiences in the first part of the ride. For 56 seconds the participant is exposed to a back projection computed generated story of attacking jungle or generic animals and various environmental threats, such as falling trees, flying volcanic rocks, etc. The participant senses motion of the vehicle 12 and the passing of reference points in the projected story. Fixed targets 16 which are hidden by off-axis lens 28 are exposed for a short time as the vehicle 12 travelled pass the lens 28 allowing the participants to engage them. For each pull of the trigger, a shot count is recorded and the participant is alerted to the shots-left during the course of the game.

As the participant successfully engages the targets 16, 16a, puffs of colored smoke corresponding to the colored cannon weapon 21 are imaged on the screen 14 in the proximity of the target 16, 16a. With fixed targets 16, the colored puffs of smoke are imaged on the screens 14 in the general location of the fixed target 16. When the targets 16, 16a are engaged, sound effects are directed at the participant to give a realistic effect and, where necessary, the vehicle actuators 25 are engaged imparting a motion change as the scenario warrants. For example, the participant engages a flying volcanic rock. As the rock explodes a corresponding shaking of the surrounding atmosphere, and thus a vehicle jerk or jolt occurs. Because the sound system 10 is directive the fragments of the rock appear to pass over the head of the participant and travel to the rear. After the first 56 seconds the participants experience a 3 sec gray-out as they pass from one scenario to the next. This technique continues for each of seven scenarios until the ride ends, approximately 7 minutes after the vehicle leaves the loading platform.

Thus there has been described a new and improved a multiple participant moving vehicle shooting gallery system employing simulated computer-generated interactive video. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A multiple participant moving vehicle shooting gallery system comprising:
an enclosure for defining a darkened lengthy path;
a track adapted to move a plurality of vehicles through the darkened path within the enclosure;
at least one vehicle disposed on the track, said at least one vehicle comprising means for seating a participant, a simulated weapon that is actuable by the participant and which is adapted to respond to light emitted from simulated moving targets in projected images, and first communication means for communicating data and control information to and from the vehicle;
a projection system comprising a plurality of rear-screen projectors and plurality of speakers disposed adjacent the track, and a plurality of projection screens disposed adjacent the track between the projectors and the vehicle, said projection screens forming a substantial portion of said enclosure, and wherein the projectors are adapted to project images onto the screens that comprise the simulated moving targets, and wherein the plurality of speakers are adapted to project sound in conjunction with the projected images;
a control station, comprising a computer, a video processor, a sound system including a sound processor and the plurality of speakers, second communication means for communicating data and control information to the first communication means in the vehicle, means for controlling an adjustable game scenario comprising a story line, wherein said adjustable game scenario comprises a plurality of scenes, each scene comprising images and sounds, including images and sounds representative of the simulated targets, and being projected on a different projection screen, and the projection of images and sound representative of the adjustable game scenario and the simulated targets to which the participants respond, means for varying the order of the playing of the scenes and for selecting the projection screen to play said scene, means for controlling the movement of the vehicle along the track, and means for processing hits and misses scored by the participants in response to operation of the weapon.

2. The system of claim 1 which further comprises:
a plurality of fixed targets disposed adjacent the track and plurality of projection screens that are controllable by the central station.

3. The system of claim 1 wherein the vehicle further comprises:
a plurality of vehicle actuators for causing changes in pitch and roll of said vehicle in response to actuator control signals provided by the control station, and said control station further comprises means for generating said actuator control signals in dependence on said adjustable game scenario for causing vehicle motion changes in pitch and roll induced by said story line.

4. The system of claim 1 wherein the simulated weapon further comprises:
a laser diode adapted to detect predetermined light levels located in the projected images that are indicative of a hit on the target.

5. The system of claim 1 wherein the simulated weapon further comprises:
a trigger adapted to fire the simulated weapon;
a laser diode adapted to detect predetermined light levels located in the projected images that are indicative of a hit on a target in the vicinity of the predetermined light levels when the trigger is depressed, and which is adapted to generate a signal indicative of hits and misses that is communicable to the central station by the first communication means.

6. The system of claim 1 wherein the vehicle further comprises: a plurality of speakers disposed adjacent the means for seating the participant.

7. The system of claim 1, said control station providing means for communicating with, controlling, and processing information for a plurality of vehicles.

8. The system of claim 1, wherein said darkened path comprises a lengthy serpentine shaped path.

9. The system of claim 1, wherein said second communications means for controlling the projection of images is responsive to data and information communicated from said vehicle.

10. A multiple participant moving vehicle shooting gallery system comprising:
an enclosure for defining a darkened lengthy path;
a track adapted to move a plurality of vehicles through the darkened path within the enclosure;
at least one vehicle disposed on the track, said at least one vehicle comprising means for seating a participant, a simulated weapon that is actuable by the participant, and first communication means for communicating data and control information to and from the vehicle;
a projection system comprising a plurality of rear-screen projectors and plurality of speakers disposed adjacent the track, and a plurality of projection screens disposed adjacent the track between the projectors and the vehicle, said projection screens forming a substantial portion of said enclosure, and wherein the projectors are adapted to project images onto the screens that comprise the simulated moving targets, and wherein the plurality of speakers are adapted to project sound in conjunction with the projected images;
a control station, comprising a computer, a video processor, a sound system including a sound processor and the plurality of speakers, second communication means for communicating data and control information to the first communication means in the vehicle, means for controlling a plurality of different game scenarios each comprising a different story line, wherein said game scenarios each comprise at least one scene comprising images and sounds, including images and sounds representative of the simulated targets, and being projected on a different projection screen to represent said game scenario and the simulated targets to which the participants respond, so that as said vehicle moves along said track, each of said plurality of game scenarios is encountered by the participant in sequence, means for varying the order of the playing of the scenes and for selecting the projection screen to play said scene to provide variety in the order of said game scenarios encountered by the participant along said track, means for controlling the movement of the vehicle along the track, and means for processing hits and misses scored by the participants in response to operation of the weapon;
said system further characterized in that each vehicle traverses the same path without regard to said scoring by the participants.

11. The system of claim 10 wherein said simulated weapon is adapted to respond to light emitted from simulated moving targets in projected images.

12. The system of claim 11 wherein the simulated weapon further comprises:
a laser diode adapted to detect predetermined light levels located in the projected images that are indicative of a hit on the target.

13. The system of claim 11 wherein the simulated weapon further comprises:
a trigger adapted to fire the simulated weapon;
a laser diode adapted to detect predetermined light levels located in the projected images that are indicative of a hit on a target in the vicinity of the predetermined light levels when the trigger is depressed, and which is adapted to generate a signal indicative of hits and misses that is communicable to the central station by the first communication means.

14. The system of claim 10 which further comprises:
a plurality of fixed targets disposed adjacent the track and plurality of projection screens that are controllable by the central station.

15. The system of claim 10 wherein the vehicle further comprises:
a plurality of speakers disposed adjacent the means for seating the participant.

16. The system of claim 10, said control station providing means for communicating with, controlling, and processing information for a plurality of vehicles.

17. The system of claim 10, wherein said darkened path comprises a lengthy serpentine shaped path.

18. The system of claim 10, wherein said second communications means for controlling the projection of image is responsive to data and information communicated from said vehicle.

19. The system of claim 10 wherein the vehicle further comprises:
a plurality of vehicle actuators for causing changes in pitch and roll of said vehicle in response to actuator control signals provided by the control station, and said control station further comprises means for generating said actuator control signals in dependence on said adjustable game scenario for causing vehicle motion changes in pitch and roll induced by said story line.

* * * * *